United States Patent
Hisatake (10) Patent No.: US 7,561,233 B2
(45) Date of Patent: Jul. 14, 2009

(54) LIQUID CRYSTAL DISPLAY DEVICE

(75) Inventor: Yuzo Hisatake, Yokohama (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 342 days.

(21) Appl. No.: 11/502,391

(22) Filed: Aug. 11, 2006

(65) Prior Publication Data

US 2006/0290854 A1    Dec. 28, 2006

Related U.S. Application Data (63) Continuation of application No. PCT/JP2005/001758, filed on Feb. 7, 2005.

(30) Foreign Application Priority Data

Feb. 13, 2004    (JP)    ............... 2004-036222

(51) Int. Cl.
 G02F 1/1335    (2006.01)
 G02F 1/1345    (2006.01)

(52) U.S. Cl. ............... 349/119; 349/117; 349/118; 349/120

(58) Field of Classification Search ......... 349/117–121, 349/149
See application file for complete search history.

(56) References Cited

U.S. PATENT DOCUMENTS

| 5,883,685 | A  | 3/1999  | Mazaki et al. |
| 6,582,775 | B1 | 6/2003  | Payne et al. |
| 7,006,184 | B2 * | 2/2006 | Mi et al. ............... 349/130 |
| 2003/0193637 | A1 | 10/2003 | Mi et al. |
| 2006/0221286 | A1 * | 10/2006 | Allen et al. ............... 349/121 |

FOREIGN PATENT DOCUMENTS

| CN | 1414417 A | 4/2003 |
| EP | 0 704 514 A2 | 4/1996 |
| JP | 10-197862 | 7/1998 |
| JP | 11-64840 A | 3/1999 |
| JP | 3118197 | 10/2000 |
| JP | 2002-533784 A | 10/2002 |
| JP | 2004-38148 A | 2/2004 |
| TW | 504590 | 10/2002 |
| TW | 574521 | 2/2004 |
| WO | WO 00/39631 | 7/2000 |

* cited by examiner

*Primary Examiner*—Michelle R Connelly Cushwa
*Assistant Examiner*—Rhonda S Peace
(74) *Attorney, Agent, or Firm*—Oblon, Spivak, McClelland, Maier & Neustadt, P.C.

(57) ABSTRACT

In an OCB mode liquid crystal display device, a first phase layer that causes a retardation in an in-plane azimuth direction is disposed between a first polarizing layer and a liquid crystal layer such that a slow axis of the first phase layer intersects at right angles with an absorption axis of the first polarizing layer, a second phase layer that causes a retardation in an in-plane azimuth direction is disposed between a second polarizing layer and the first phase layer such that a slow axis of the second phase layer intersects at right angles with an in-plane azimuth direction in which liquid crystal molecules are inclined, and a third phase layer, which has an optical axis in a normal direction of the liquid crystal display device and has, as a whole, a negative uniaxial function, is disposed between the second polarizing layer and the first phase layer.

1 Claim, 9 Drawing Sheets

LIQUID CRYSTAL DISPLAY DEVICE

CROSS REFERENCE TO RELATED APPLICATIONS

This is a Continuation application of PCT Application No. PCT/JP2005/001758, filed Feb. 7, 2005, which was published under PCT Article 21(2) in Japanese.

This application is based upon and claims the benefit of priority from prior Japanese Patent Application No. 2004-036222, filed Feb. 13, 2004, the entire contents of which are incorporated herein by reference.

BACKGROUND OF THE INVENTION

1. Field of the Invention

The present invention relates to a liquid crystal display device, and more particularly to a liquid crystal display device of an OCB (Optically Compensated Bend) mode, which can realize a wide viewing angle and high responsivity.

2. Description of the Related Art

A liquid crystal display device has various features such as thickness in size, light weight, and low power consumption. The liquid crystal display device is applied to various uses, e.g. OA equipment, information terminals, timepieces, and TVs. In particular, a liquid crystal display device comprising thin-film transistors (TFTs) has high responsivity and, therefore, it is used as a monitor of a mobile TV, a computer, etc., which displays a great deal of information.

In recent years, with an increase in quantity of information, there has been a strong demand for higher image definition and higher display speed. Of these, the higher image definition is realized, for example, by making finer the array structure of the TFTs.

On the other hand, in order to increase the display speed, consideration has been given to, in place of conventional display modes, an OCB (Optically Compensated Birefringence) mode, a VAN (Vertically Aligned Nematic) mode, a HAN (Hybrid Aligned Nematic) mode and a π alignment mode, which use nematic liquid crystals, and an SSFLC (Surface-Stabilized Ferroelectric Liquid Crystal) mode and an AFLC (Anti-Ferroelectric Liquid Crystal) mode, which use smectic liquid crystals.

Of these display modes, attention has been paid to an OCB mode liquid crystal display device as a liquid crystal display device that can improve the viewing angle and the responsivity. In the OCB mode liquid crystal display device, a liquid crystal layer that includes liquid crystal molecules, which can be aligned with a bend, is held between a pair of substrates. Compared to the TN mode liquid crystal display device, the OCB mode liquid crystal display device has an improved responsivity that is higher by an order of magnitude. In addition, the OCB mode liquid crystal display device advantageously has a wider viewing angle since the effect of birefringence of light, which passes through the liquid crystal layer, is optically self-compensated by the alignment state of liquid crystal molecules.

In the case where an image is displayed by the OCB mode liquid crystal display device, black may be displayed by blocking light at a time of, e.g. high voltage application and white may be displayed by passing light at a time of low voltage application, with the control of birefringence and in combination with a polarizer plate.

When a black image is displayed, a majority of liquid crystal molecules are aligned in an electric-field direction by the high voltage application (i.e. aligned in a normal direction to the substrates). However, liquid crystal molecules in the vicinity of the substrates are not aligned in the normal direction due to interactions with the orientation films. Consequently, light that travels through the liquid crystal layer is affected by a phase difference in a predetermined direction. Owing to the effect of phase difference (retardation), in the case of viewing the screen from a frontal direction (i.e. in the normal direction to the substrate), the transmittance cannot sufficiently be reduced when a black image is displayed, and the contract deteriorates.

To cope with this problem, a uniaxial phase plate, for instance, may be used in combination. Thereby, the retardation of the liquid crystal layer is compensated when a black image is displayed, and the transmittance can sufficiently be reduced, as is conventionally known. Besides, as disclosed in Patent Document 1, for instance, it is known that discotic liquid crystal layers including hybrid-aligned optically negative discotic liquid crystal molecules are combined as phase plates, whereby black display with a sufficiently low transmittance is realized or contrast characteristics are compensated even when the screen is obliquely viewed (see, e.g. Jpn. Pat. Appln. KOKAI Publication No. 10-197862).

In the conventional structure of the OCB mode liquid crystal display device, a bend liquid crystal layer comprising bend-aligned liquid crystal molecules is disposed between two polarizer plates having absorption axes (or transmission axes) intersecting at right angles. In addition, in order to compensate viewing-angle characteristics at a time of black display, two discotic liquid crystal layers and two biaxial phase plates are used.

In this conventional structure, there are three objects for optical compensation: a positive retardation in a normal direction to the bend liquid crystal layer; a residual retardation in an in-plane direction of the bend liquid crystal layer; and positive dichroism of the polarizer plate.

Specifically, the bend liquid crystal layer, when viewed as a whole, is a biaxial refractive-index anisotropic body ($nz>nx>ny$). Hence, the bend liquid crystal layer has a positive retardation in its normal direction, and has retardation in its in-plane direction. The retardation in the normal direction is mainly compensated by using the discotic liquid crystal layer and biaxial phase plate. The residual retardation in the in-plane direction is mainly compensated by using the discotic liquid crystal layer.

However, these retardations that are due to a liquid crystal have a large degree of wavelength dispersion. On the other hand, in many cases, the biaxial phase plate for compensating the retardation in the normal direction is formed of a drawn film, and the wavelength dispersion thereof cannot be increased to a level of the phase plate including liquid crystal molecules. Thus, even if the retardation in the normal direction is successfully compensated with respect to a specific wavelength, the wavelength dispersion of the bend liquid crystal layer does not agree with the wavelength dispersion of the biaxial phase plate with respect to the other majority of wavelengths, and adequate compensation cannot be effected. Consequently, there arises such a problem that the contrast characteristics and color reproducibility in relation to the inclination from the normal of the screen, that is, the viewing-angle characteristics of contrast and color, are insufficient.

Like the bend liquid crystal layer, the discotic liquid crystal layer for compensating the in-plane directional retardation has a large degree of wavelength dispersion, and the retardation in the in-plane direction of the bend liquid crystal layer can be almost compensated in the range of visible wavelengths. Thus, the contrast characteristics and color reproducibility in the normal direction of the screen are good.

The positive dichroism in the polarizer plate can be compensated by using the biaxial phase plate having a slow axis in a direction intersecting at right angles with the direction of dichroism. However, the dichroism of the polarizer plate has a wavelength dispersion with a polarity opposite to the polarity of the wavelength dispersion of the bend liquid crystal layer (for example, the bend liquid crystal layer has such wavelength dispersion that the retardation increases as the wavelength becomes shorter, while the polarizer plate has such wavelength dispersion that the retardation increases as the wavelength becomes greater). By contrast, the biaxial phase plate has a low degree of wavelength dispersion. Thus, even if the positive dichroism is successfully compensated with respect to a specific wavelength, the wavelength dispersion of the polarizer plate does not agree with the wavelength dispersion of the biaxial phase plate with respect to the other majority of wavelengths, and adequate compensation cannot be effected. Consequently, there arises such a problem that the viewing-angle characteristics of contrast and color are insufficient.

In addition to these problems, there is such a problem that the manufacturing cost of the discotic liquid crystal layer and biaxial phase plate is high, and this leads to an increase in manufacturing cost of the whole liquid crystal display apparatus.

BRIEF SUMMARY OF THE INVENTION

The present invention has been made in consideration of the above-described problems, and the object of the invention is to provide a liquid crystal display device with excellent viewing-angle characteristics and display quality, which is capable of realizing cost reduction.

According to an aspect of the present invention, there is provided a liquid crystal display device including:

a liquid crystal panel having a liquid crystal layer held between a pair of substrates;

a first polarizing layer that is disposed on a light incidence side of the liquid crystal panel; and a second polarizing layer that is disposed on a light emission side of the liquid crystal panel, the liquid crystal display device being of a birefringence mode, in which the liquid crystal layer has a residual retardation in an in-plane direction and has a positive retardation in a thickness direction at a time of dark display of the liquid crystal display device, wherein a first phase layer that is a positive uniaxial phase layer, which compensates viewing-angle characteristics with respect to light emerging from the first polarizing layer, is disposed between the first polarizing layer and the liquid crystal layer, and a second retardation function, which compensates the residual retardation in the liquid crystal layer, and a third retardation function, which compensates the positive retardation in the thickness direction of the liquid crystal layer, are provided between the second polarizing layer and the first phase layer.

DETAILED DESCRIPTION OF THE INVENTION

A liquid crystal display device according to an embodiment of the present invention will now be described with reference to the accompanying drawings. In this embodiment, in particular, an OCB (Optically Compensated Bend) mode liquid crystal display device is described as an example of a birefringence mode liquid crystal display device.

Figure 1:
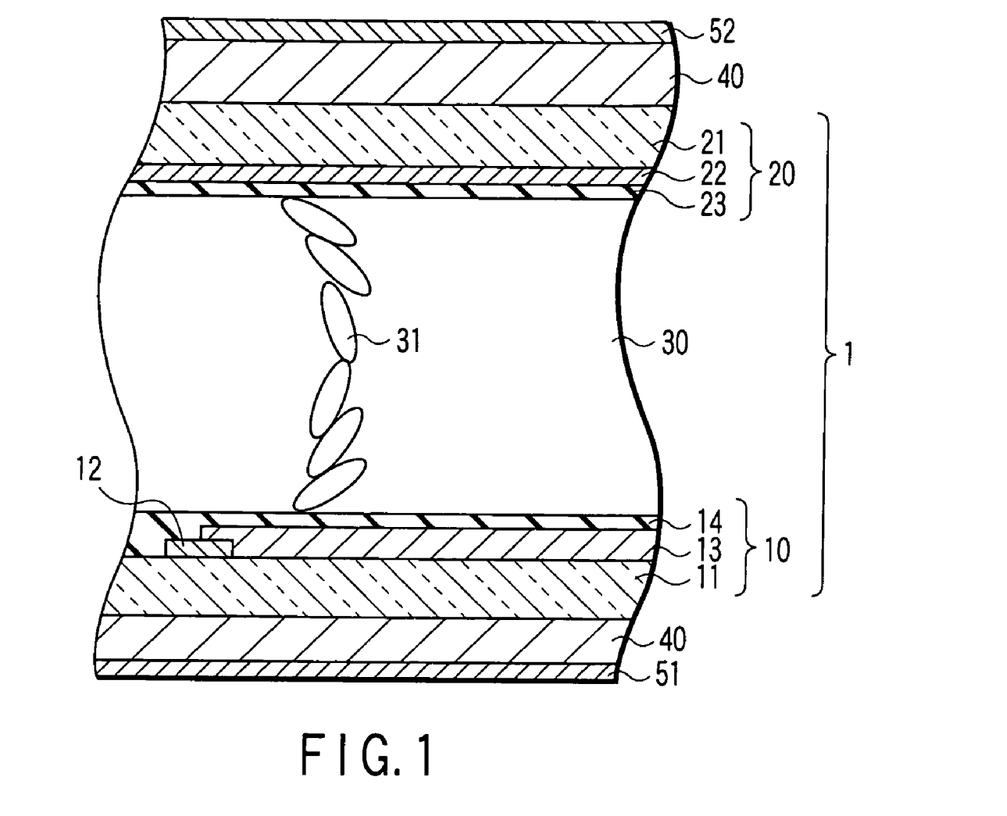
FIG. 1 is a cross-sectional view that schematically shows the structure of an OCB liquid crystal display device according to an embodiment of the present invention.

As is shown in FIG. 1, the OCB liquid crystal display device includes a dot-matrix liquid crystal panel 1 that is configured such that a liquid crystal layer (nematic liquid crystal layer) 30 is held between a pair of substrates, that is, an array substrate 10 and a counter-substrate 20. The liquid crystal panel 1 is, for example, of a transmissive type and is configured to pass backlight from a backlight unit (not shown) that is disposed on the array substrate 10 side to the counter-substrate 20 side.

The array substrate 10 is formed using an insulating substrate 11 of, e.g. glass. The array substrate 10 includes a switching element 12, a pixel electrode 13 and an orientation film 14 on one major surface of the insulating substrate 11. The switching element 12 is composed of, e.g. a TFT (Thin Film Transistor), an MIM (Metal Insulated Metal) or a TFD (Thin Film Diode). The pixel electrode 13 is disposed for each of pixels arranged in a matrix, and is electrically connected to the switching element 12. The pixel electrode 13 is formed of a light-transmissive, electrically conductive material such as ITO (Indium Tin Oxide) or IZO (Indium Zinc Oxide). The orientation film 14 is disposed so as to cover the entire major surface of the insulating substrate 11.

The counter-substrate 20 is formed using an insulating substrate 21 of, e.g. glass. The counter-substrate 20 includes a counter-electrode 22 and an orientation film 23 on one major surface of the insulating substrate 21. The counter-electrode 22 is formed of a light-transmissive, electrically conductive material such as ITO or IZO. The orientation film 23 is disposed so as to cover the entire major surface of the insulating substrate 21.

In the color-display type liquid crystal display device, the liquid crystal panel 1 includes color pixels of a plurality of colors, e.g. red (R), green (G) and blue (B). Specifically, the red pixel has a red color filter that mainly passes light of a red wavelength. The green pixel has a green color filter that mainly passes light of a green wavelength. The blue pixel has a blue color filter that mainly passes light of a blue wavelength. These color filters are disposed on the major surface of the array substrate 10 or counter-substrate 20.

The array substrate 10 and counter-substrate 20 having the above-described structures are attached to each other with a predetermined gap via spacers (not shown). The liquid crystal layer 30 is sealed in the gap between the array substrate 10 and counter-substrate 20. A material, which has positive dielectric-constant anisotropy and optically positive uniaxiality, may be chosen for liquid crystal molecules 31 included in the liquid crystal layer 30.

The liquid crystal panel 1 is disposed between a pair of polarizing layers, that is, a first polarizing layer 51 and a second polarizing layer 52. The first polarizing layer 51 is disposed, for example, on the light incidence side of the liquid crystal panel 1, i.e. on the outer surface side of the array substrate 10. The second polarizing layer 52 is disposed, for example, on the light emission side of the liquid crystal panel 1, i.e. on the outer surface side of the counter-substrate 20. Optical compensation elements 40, which optically compensate the retardation in the liquid crystal layer 30 in a predetermined display state and the positive dichroism of the first polarizing layer 51 and second polarizing layer 52, are disposed between the first polarizing layer 51 and liquid crystal panel 1 and between the second polarizing layer 52 and liquid crystal panel 1.

Figure 2:
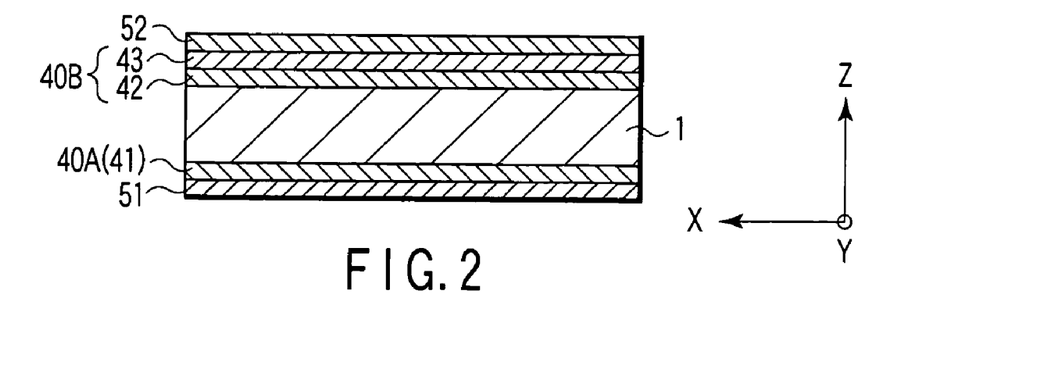
FIG. 2 schematically shows the structure of optical compensation elements that are applied to the OCB liquid crystal display device.

As is shown in FIG. 2, for example, an optical compensation element 40A, which is disposed between the first polarizing layer 51 and liquid crystal panel 1, includes a first phase layer (A plate) 41. An optical compensation element 40B, which is disposed between the second polarizing layer 52 and liquid crystal panel 1, includes a second phase layer (A plate) 42 and a third phase layer (C plate) 43. The first phase layer 41 may be disposed anywhere between the first polarizing layer 51 and liquid crystal layer 30. The second phase layer 42 may be disposed anywhere between the second polarizing layer 52 and first phase layer 41. The third phase layer 43 may be disposed anywhere between the second polarizing layer 52 and first phase layer 41.

Figure 3:
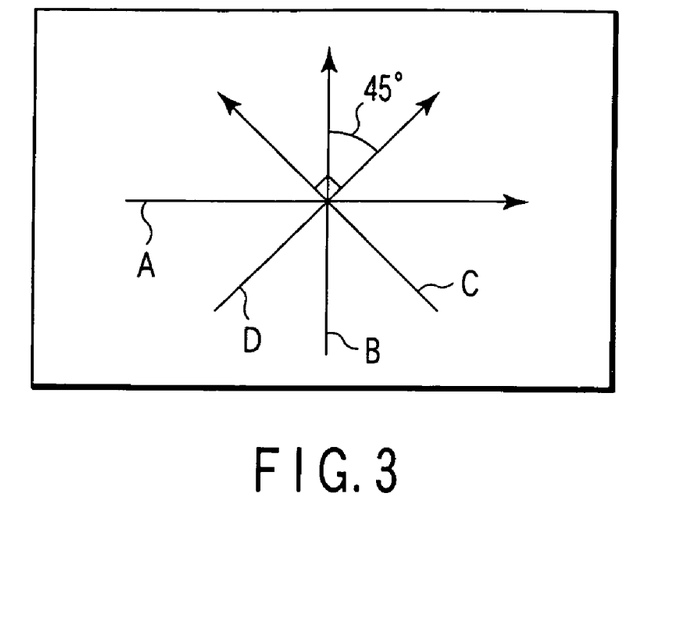
FIG. 3 shows a relationship between the direction of the optical axis of each of optical members, which constitute the optical compensation elements shown in FIG. 2, and the direction of liquid crystal alignment.

For the purpose of convenience, as shown in FIG. 3, a plane that is parallel to the major surfaces of the array substrate 10 and counter-substrate 20 is referred to as "substrate plane", and directions in the substrate plane are referred to as "in-plane azimuth directions". A horizontal direction of the screen corresponds to a 0° azimuth, as indicated by an arrow A, and a vertical direction of the screen corresponds to a 90° azimuth, as indicated by an arrow B.

The orientation films 14 and 23 are subjected to a parallel orientation process. That is, the orientation films 14 and 23 are rubbed in the direction of arrow A in the Figure. Thereby, an orthogonal projection of the optical axis of the liquid crystal molecules 31 (i.e. direction of liquid crystal alignment) becomes parallel to the direction of arrow B. Specifically, in a state in which no voltage is applied to the pixel, the liquid crystal molecules 31 are aligned with a tilt to the normal direction of the substrate plane (the thickness direction of the liquid crystal layer) in the vicinity of the interface of the liquid crystal layer 30 due to the effect of the orientation films 14 and 23. In addition, in the vicinity of the array substrate 10 and counter-substrate 20, the liquid crystal molecules are inclined substantially in the same in-plane azimuth direction, i.e. at an about 90° azimuth.

At this time, the liquid crystal molecules 31 are set in a splay or bend alignment between the array substrate 10 and counter-substrate 20. In addition, in a state in which an image can be displayed, for example, in a state in which a predetermined bias is applied, the liquid crystal molecules 31 are set in a bend alignment between the array substrate 10 and counter-substrate 20 in a cross section of the liquid crystal layer 30, which is defined by the arrow B.

The first polarizing layer 51 is disposed such that its optical axis (i.e. transmission axis or absorption axis) is set at a 135° azimuth, as indicated by an arrow C in the Figure. The second polarizing layer 52 is disposed such that its optical axis (i.e. transmission axis or absorption axis) is set at a 45° azimuth, as indicated by an arrow D in the Figure. In short, the optical axes of the first polarizing layer 51 and second polarizing layer 52 are set at 45° to the liquid crystal alignment direction B and intersect at right angles with each other.

In the OCB liquid crystal display device, a voltage is applied to the pixel and the angle of inclination of the liquid crystal molecules 31 is controlled by the bend molecular orientation. Thereby, the retardation in the liquid crystal layer 30 is modulated and the light/dark display state is controlled.

Figure 4:
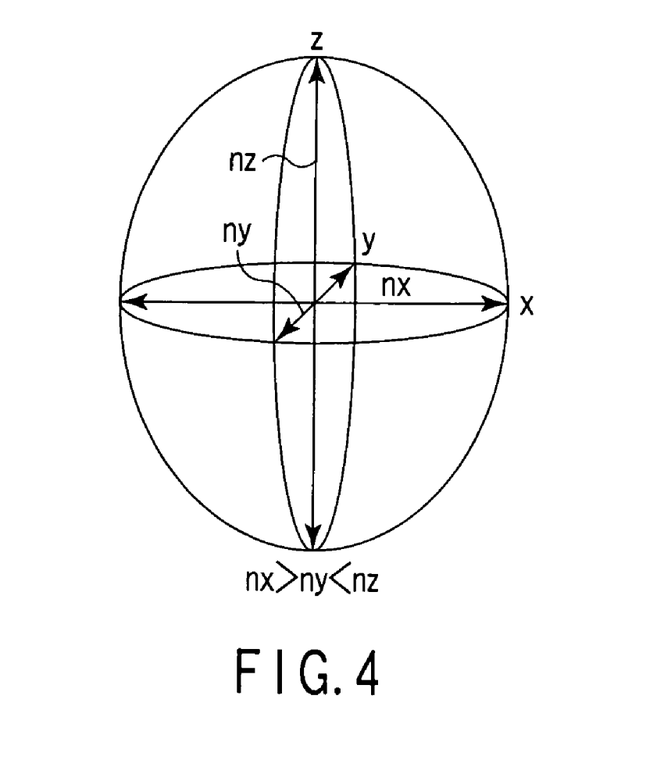
FIG. 4 is a view for explaining retardation in a bend liquid crystal layer in a state in which an image can be displayed.

In the meantime, even if a high voltage is applied to the bend liquid crystal layer 30, as described above, all the liquid crystal molecules 31 are not oriented along the normal direction of the substrate, and the liquid crystal layer 30 has retardation. Specifically, the bend liquid crystal layer 30, when viewed as a whole, is a biaxial refractive-index anisotropic body (nz>nx>ny), as shown in FIG. 4. Thus, the bend liquid crystal layer 30 has a positive retardation in its normal direction (z-direction), and has retardation in its in-plane direction (x-y plane). It is assumed that the x-axis corresponds to a 0° azimuth, the major refractive index in the x-axis direction is nx, the y-axis corresponds to a 90° azimuth, the major refractive index in the y-axis direction is ny, the z-axis corresponds to the normal direction to the substrate plane, and the major refractive index in the z-axis direction is nz.

In order to optically compensate the retardation in the in-plane direction of the liquid crystal layer 30, the second phase layer 42 is provided. Specifically, the second phase layer 42 has such a retardation function that the retardation in the in-plane direction of the liquid crystal layer 30 (i.e. the retardation in the liquid crystal layer 30 that has an effect when the screen is viewed in the frontal direction) can be canceled in a specific voltage-application state (e.g. in a state in which black is displayed by application of a high voltage; a dark display state).

Figure 5:
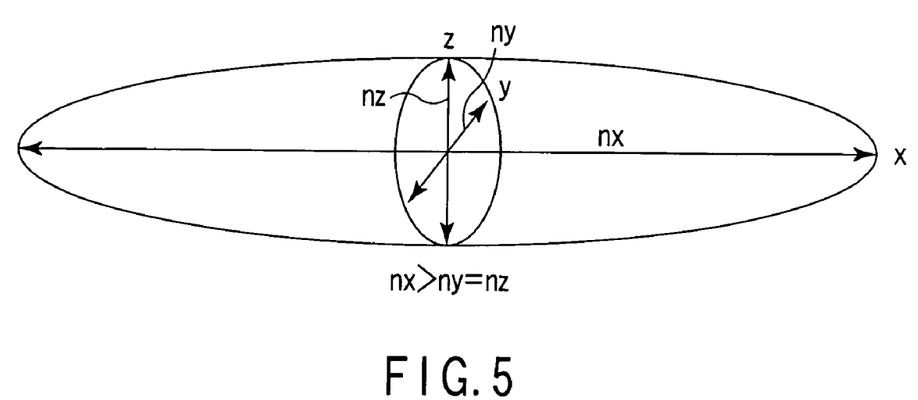
FIG. 5 is a view for explaining retardation in a first phase layer and a second phase layer.

The second phase layer 42, as shown in FIG. 5, has a uniaxial refractive-index anisotropy (nx>ny=nz). In the second phase layer 42, the x-axis corresponds to the 0° azimuth, the y-axis corresponds to the 90° azimuth, and the z-axis corresponds to the normal direction to the substrate plane. The direction (0° azimuth) A of the optical axis (i.e. slow axis) of the second phase layer 42 is perpendicular to the direction (90° azimuth) in which a retardation occurs in the in-plane direction of the liquid crystal layer 30, that is, to a liquid crystal alignment direction B. In short, the second phase layer 42 has retardation in the direction A.

Thereby, it becomes possible to cancel the retardation of the liquid crystal layer 30 in the in-plane direction, to combine the liquid crystal layer 30 and second phase layer 42 to create a state with an effectively zero retardation amount, and to obtain a sufficient contrast when the screen is viewed in the frontal direction (i.e. normal direction to the substrate plane).

The second phase layer 42 with the above-described retardation can be formed of a liquid crystal polymer. The liquid crystal polymer is composed of, e.g. a nematic liquid crystal polymer. The second liquid crystal layer 42 is formed by orienting liquid crystal polymer molecules such that the molecular major axis of the liquid crystal polymers is substantially parallel to the slow axis direction of the second phase layer 42, i.e. the 0° azimuth.

The wavelength dispersion of the second phase layer 42, which is formed using such liquid crystal molecules, substantially agrees with the wavelength dispersion of the liquid crystal layer 30, which is similarly formed of liquid crystal molecules, at least in the range of visible wavelengths. In other words, when the ratio of a value at a wavelength of 440 nm to a value at a wavelength of 620 nm is referred to as a wavelength dispersion value, the wavelength dispersion value of the retardation in the second phase layer 42 is substantially equal to the wavelength dispersion value of refractive index anisotropy Δnlc in the liquid crystal layer 30 with bend molecular orientation. Thus, when the screen is viewed in the frontal direction, good contrast characteristics and color reproducibility can be realized.

A retardation value R2 of the second phase layer 42 can be adjusted by controlling the refractive index anisotropy of liquid crystal polymer of the phase layer and the thickness of the phase layer. In this case, the retardation value R2 of the second phase layer 42 is set to be substantially equal to a retardation value Rlc in the in-plane direction at a time when a specific voltage is applied to the liquid crystal layer 30 with bend molecular orientation (e.g. when a voltage for black display is applied). Strictly speaking, the absolute value of the retardation value R2 is substantially equal to the absolute value of the retardation value Rlc, and their polarities (positive/negative) are different. Thus, in particular, the retardation in the in-plane direction of the liquid crystal layer 30 is canceled when a specific voltage is applied, and good contrast characteristics are realized.

The retardation value R2 of the second phase layer 42 is set at 100 nm or less at a wavelength of 550 nm. The lower the retardation value R2, the greater the mean tilt angle of liquid crystal molecules of the liquid crystal layer 30 for obtaining black display. In other words, the liquid crystal molecules are oriented in a state close to vertical alignment. Accordingly, the smaller the retardation value R2, the higher the voltage that is applied to the pixel in order to obtain black display. If the voltage value is too high, there arises such a problem that a load on driving occurs. If the voltage value is too low, electro-optical characteristics become too sharp and a sufficient margin cannot be secured. In consideration of the controllability in thickness of the liquid crystal layer and the non-uniformity in characteristics of switching elements 12, it is preferable to set the retardation value R2 at 100 nm or less. In the meantime, if the retardation value R2 is set at an excessively low value, the driving voltage increases, as mentioned above. However, this also depends on the dielectric constant anisotropy of liquid crystal material, and the lower-limit value of the retardation value R2 cannot generally be determined.

On the other hand, the third phase layer 43 is provided in order to optically compensate the positive retardation in the normal direction (thickness direction) of the liquid crystal layer 30. Specifically, the third phase layer 43 has an optical axis in its normal direction, and the third phase layer 43, as a whole, has optical characteristics reverse to those of the liquid crystal molecules 31, that is, a negative uniaxial retardation function in a specific voltage application state (e.g. in a state for displaying black with application of a high voltage). In other words, the third phase layer 43 causes such a retardation as to cancel the retardation in the normal direction of the liquid crystal layer 30 (i.e. the retardation of the liquid crystal layer 30, which has an effect when the screen is obliquely viewed). Preferably, the third phase layer 43 causes such a retardation that a total $R_{(total)}$ of normal-directional retardations in the structural members, other than the third phase layer 43, which are disposed between the first polarizing layer 51 and second polarizing layer 52, becomes substantially zero at a wavelength of 550 nm.

Figure 6:
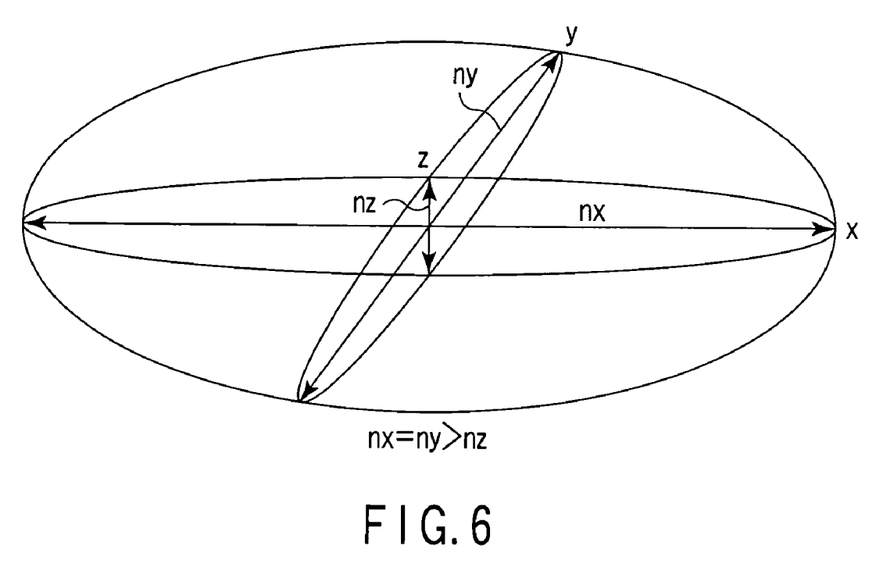
FIG. 6 is a view for explaining retardation in a third phase layer.

The third phase layer 43, as shown in FIG. 6, has such a uniaxial refractive-index anisotropy (nx=ny>nz) that the major refractive index nz in its thickness direction (normal direction) is relatively small and the major refractive indices nx and ny in its in-plane direction are relatively large. In the third phase layer 43, the x-axis corresponds to the 0° azimuth, the y-axis corresponds to the 90° azimuth, and the z-axis corresponds to the normal direction. Specifically, the optical axis (i.e. slow axis) of the third phase layer 43 is parallel to the normal direction of the liquid crystal layer 30. In short, the third phase layer 43 has retardation in the normal direction.

Thereby, it becomes possible to cancel the retardation of the liquid crystal layer 30 in the normal direction, to combine the liquid crystal layer 30 and third phase layer 43 to create a state with an effectively zero retardation amount, and to obtain a sufficient contrast even when the screen is obliquely viewed. In short, the viewing-angle characteristics of contrast can be improved.

The third phase layer 43 with the above-described retardation can be formed of a liquid crystal polymer. The liquid crystal polymer is composed of, e.g. a chiral nematic liquid crystal polymer or a cholesteric liquid crystal polymer. In the third phase layer 43, the helical axis of the liquid crystal polymer is substantially parallel to the normal direction (layer thickness direction) to the major surface of the third phase layer 43. When the twist pitch of liquid crystal polymer is P and the mean refractive index of liquid crystal polymer at a wavelength of 400 nm is n ($=((ne^2+no^2)/2)^{1/2}$; where ne is a major refractive index with respect to extraordinary rays, and no is a major refractive index with respect to ordinary rays), the value (n×P) is less than 400 nm. Alternatively, the third phase layer 43 may be formed of a discotic liquid crystal polymer. In this case, the third phase layer 43 is formed by orienting liquid crystal polymer molecules such that the molecular optical axis of the liquid crystal polymers is substantially parallel to the normal direction of the third phase layer 43.

The wavelength dispersion of the third phase layer 43, which is formed using such liquid crystal molecules, substantially agrees with the wavelength dispersion of the liquid crystal layer 30, which is similarly formed of liquid crystal molecules, at least in the range of visible wavelengths. In other words, the wavelength dispersion value of the retardation in the third phase layer 43 is substantially equal to the wavelength dispersion value of refractive index anisotropy Δnlc in the liquid crystal layer 30 with bend molecular orientation. Preferably, the wavelength dispersion value of the retardation R3 of the third phase layer 43 is substantially equal to a total $R_{(total)}$ of normal-directional retardations in the structural members, other than the third phase layer 43, which are disposed between the first polarizing layer 51 and second polarizing layer 52. Thus, when the screen is obliquely viewed, good color reproducibility can be realized. That is, the viewing-angle characteristics of color reproducibility can be improved. Therefore, the increase in viewing angle can be realized.

As has been described above, two of the three objects for optical compensation can be compensated. That is, (1) the residual retardation in the in-plane direction at the time of dark display, as well as the wavelength dispersion, can be compensated by the second phase layer 42, and (2) the positive retardation in the normal direction, as well as the wavelength dispersion, can be compensated by the third phase layer 43. The other object for optical compensation, i.e. (3) the positive dichroism in the first polarizing layer 51 and second polarizing layer 52, as well as the wavelength dispersion, can be compensated by the first phase layer 41.

Figure 7:
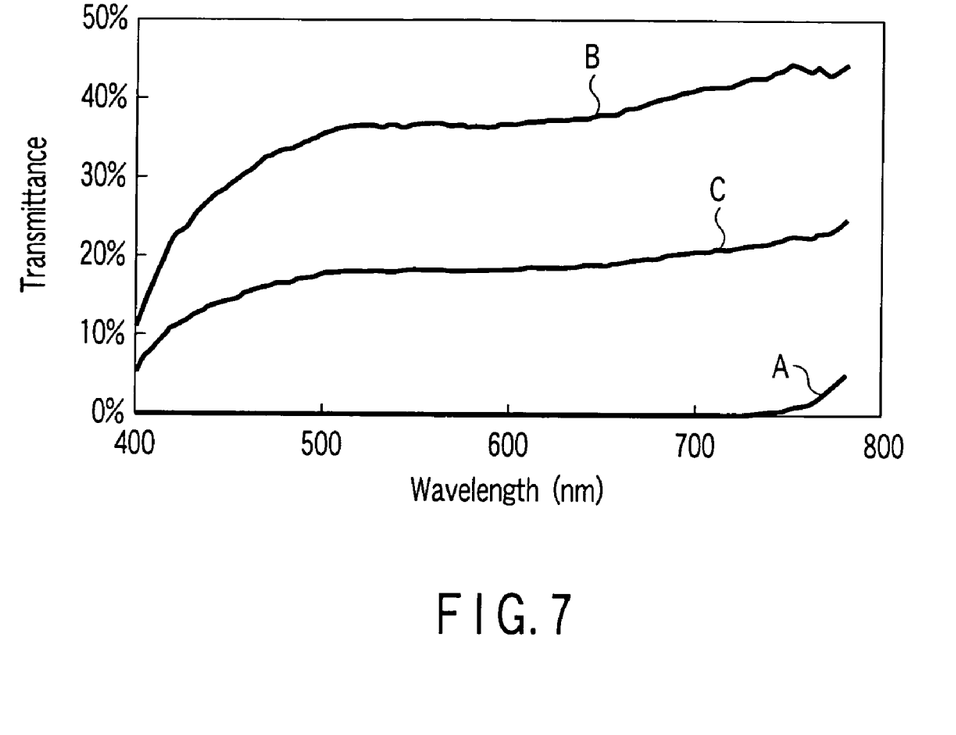
FIG. 7 is a view for explaining wavelength dispersion with respect to the transmittance of light that passes through a crossed-Nicol polarizer plate.

A polarizer plate, which is generally applied, has positive dichroism. That is, the polarizer plate has an absorption axis only in one direction. Assume that two such polarizer plates are combined and disposed such that their absorption axes intersect at right angles in the substrate plane. The transmittance of light, which passes through the two polarizer plates, will now be discussed. Since the absorption axes intersect at right angles, the transmittance can be set at about 0% in the entire range of visible wavelengths, as indicated by A in FIG. 7, when the screen is viewed in the normal direction (frontal direction) of the substrate plane.

On the other hand, when the screen is viewed in an oblique direction to the substrate plane, the crossed-axes angle of the absorption axes is not 90° (less than 90° or greater than 90° depending on viewing angles). Hence, part of the light passes through the two polarizer plates. When the screen is viewed in a substantially lateral direction (about 89° to the normal of the substrate plane), the crossed-axes angle of the absorption axes is substantially zero. Thus, as indicated by B in FIG. 7, the transmittance of light passing through the two polarizer plates is nearly the same as in the case of parallel polarizer plates. That is, linearly polarized light passes through the two polarizer plates. When the screen is viewed at 45° to the normal direction of the substrate plane (viewing angle of 45°), the transmittance, as indicated by C in FIG. 7, takes a value between the transmittance indicated by A and the transmittance indicated by B. In other words, light that passes through the two polarizer plates becomes circularly polarized light.

Figure 8:
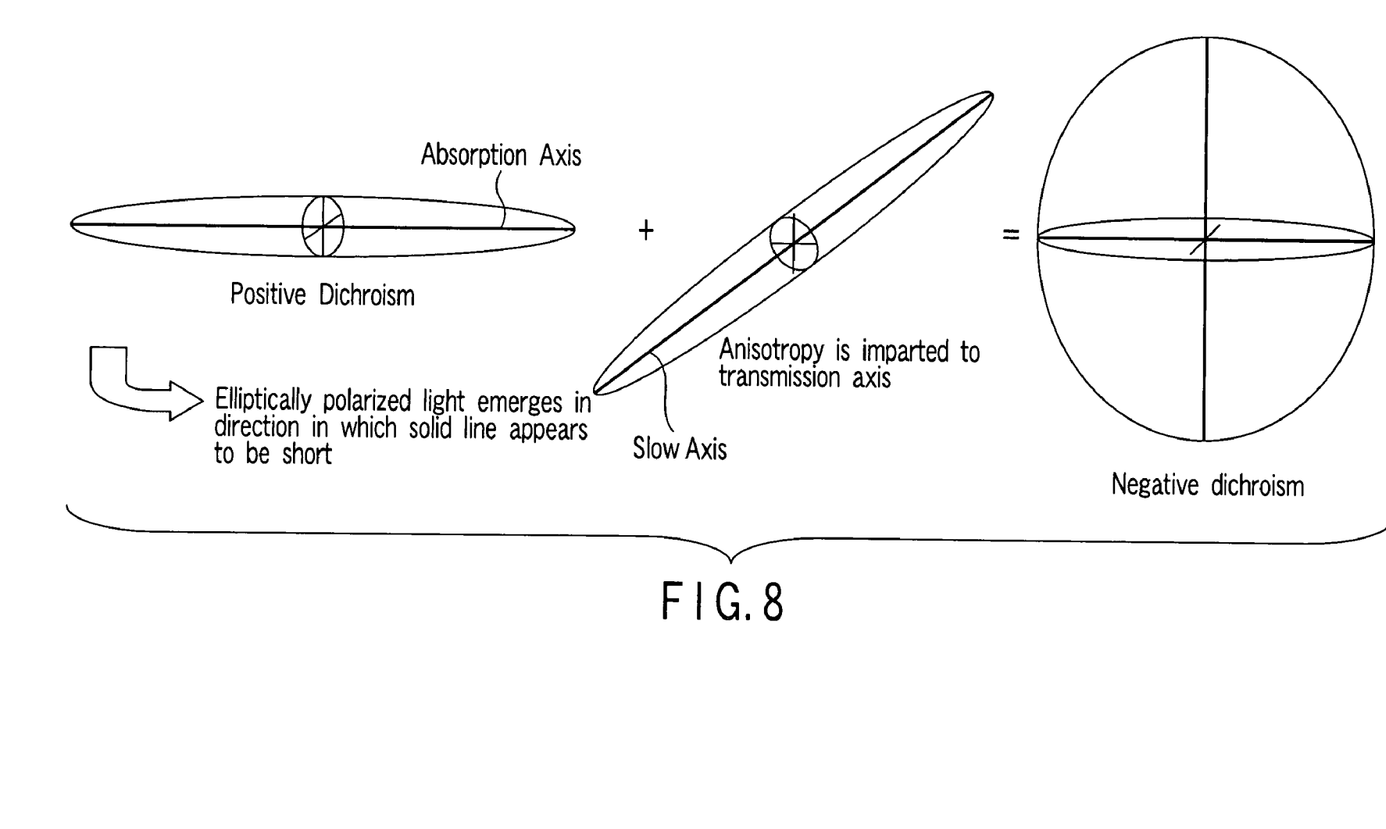
FIG. 8 is a view for explaining the principle of compensation of positive dichroism in the polarizer plate.

This can be compensated by providing a phase plate having a slow axis (i.e. anisotropy) in the transmission axis direction of the polarizer plate, as shown in FIG. 8. Assume that the polarizer plate has an absorption axis in the x-axis direction, and a transmission axis in the y-axis direction (nx>ny=nz). In order to impart anisotropy to the transmission axis of the polarizer plate, a phase plate having a slow axis in the y-axis direction (ny>nx=nz) is used in combination. The combination can function as a polarizer plate with negative dichroism.

Figure 9:
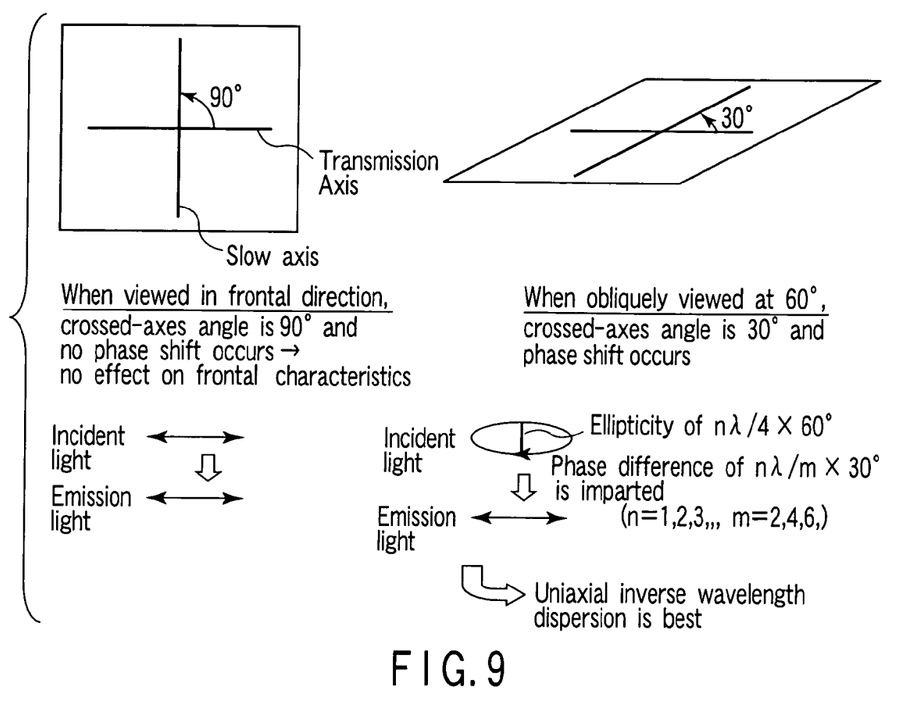
FIG. 9 is a view for explaining the principle of compensation of positive dichroism in the polarizer plate.

FIG. 9 illustrates this principle. When the screen is viewed in the normal direction to the substrate plane (i.e. in the frontal direction), the transmission axis of the polarizer plate and the slow axis of the phase plate intersect at right angles (crossed-axes angle=90). Accordingly, the phase of linearly polarized light, which has passed through one of the polarizer plates, is unchanged, and linearly polarized light will emerge.

On the other hand, when the screen is viewed in an oblique direction to the substrate plane, for example, when the screen is viewed at 60° to the normal of the substrate plane (viewing angle of 60°), the crossed-axes angle between the transmission axis of the polarizer plate and the slow axis of the phase plate is 30°. In this case, if the ellipticity of emission light from the polarizer plate is replaced with the retardation, it is expressed by (n×λ/4×viewing angle), where n=1, 2, 3, . . . In this example, the light that has passed through the polarizer plate and phase plate becomes elliptically polarized light with an ellipticity corresponding to (n×λ/4×60°). Such elliptically polarized light can be made to emanate as linearly polarized light, if the elliptically polarized light is provided with a retardation of ((90°−viewing angle)×n/m×λ) where n=1, 2, 3, . . . , and m=2, 4, 6, . . . In this example, the elliptically polarized light becomes linearly polarized light, if it is provided with a retardation of (30°×n/m×λ). In short, the retardation of the phase plate for compensating the dichroism of the polarizer plate should preferably have inverse wavelength dispersion. However, the refinement of a material of a phase plate with inverse wavelength dispersion is difficult, and the manufacturing cost is high.

In this embodiment, the first phase layer 41, which causes retardation in the in-plane direction, is disposed between the first polarizing layer 51 and liquid crystal layer 30 such that the slow axis of the first phase layer 41 intersects at right angles with the absorption axis of the first polarizing layer 51. Specifically, the first phase layer 41 causes such a retardation as to compensate positive dichroism in the first polarizing layer 51 and second polarizing layer 52.

The first phase layer 41, as shown in FIG. 5, has a uniaxial refractive-index anisotropy (nx>ny=nz). Assume that the absorption axis of the first polarizing layer 51 corresponds to a 135° azimuth in the substrate plane, and the absorption axis of the second polarizing layer 52 corresponds to a 45° azimuth in the substrate plane. In this case, in the first phase layer 41, the x-axis corresponds to the 45° azimuth, the y-axis corresponds to the 135° azimuth, and the z-axis corresponds to the normal direction to the substrate plane. The direction (45° azimuth) of the slow axis of the first phase layer 41 is perpendicular to the direction (135° azimuth) of the absorption axis of the first polarizing layer 51. In other words, the direction (45° azimuth) of the slow axis of the first phase layer 41 is parallel to the direction (45° azimuth) of the transmission axis of the first polarizing layer 51.

The first phase layer 41 with this retardation has a high degree of wavelength dispersion. Taking advantage of this feature, the first phase layer 41 can be formed of a liquid crystal polymer. The liquid crystal polymer is composed of, e.g. a nematic liquid crystal polymer. The first liquid crystal layer 41 is formed by aligning liquid crystal polymer molecules such that the molecular major axis of the liquid crystal polymers is substantially parallel to the slow axis direction of the first phase layer 41, i.e. the 45° azimuth.

The wavelength dispersion of the first phase layer 41, which is formed using such liquid crystal molecules, substantially agrees with the wavelength dispersion that is necessary for compensating the dichroism of the first polarizing layer 51 and second polarizing layer 52, at least in the range of visible wavelengths. A retardation value R1 of the first phase layer 41 can be adjusted by controlling the refractive index anisotropy Δn1 of liquid crystal polymers of the phase layer and the thickness t1 of the phase layer. Specifically, the retardation value R1 of the first phase layer 41 is given by a product of the refractive index anisotropy and the layer thickness, i.e. (Δn1×t1).

To be specific, the first phase layer 41 is formed of a liquid crystal polymer with a layer thickness t1 and a refractive index anisotropy, which are set so that multiplication values (Δn1$_{(440)}$×t1) and (Δn1$_{(620)}$×t1) of refractive index anisotropies $\Delta n1_{(440)}$ and $\Delta n1_{(620)}$ at wavelengths 440 nm and 620 nm of liquid crystal molecules in the liquid crystal polymer layer may become nearly $m\lambda/8$ (m=1, 2, 3, 4, ... ) with respect to the wavelength $\lambda$ of incident light.

Figure 10:
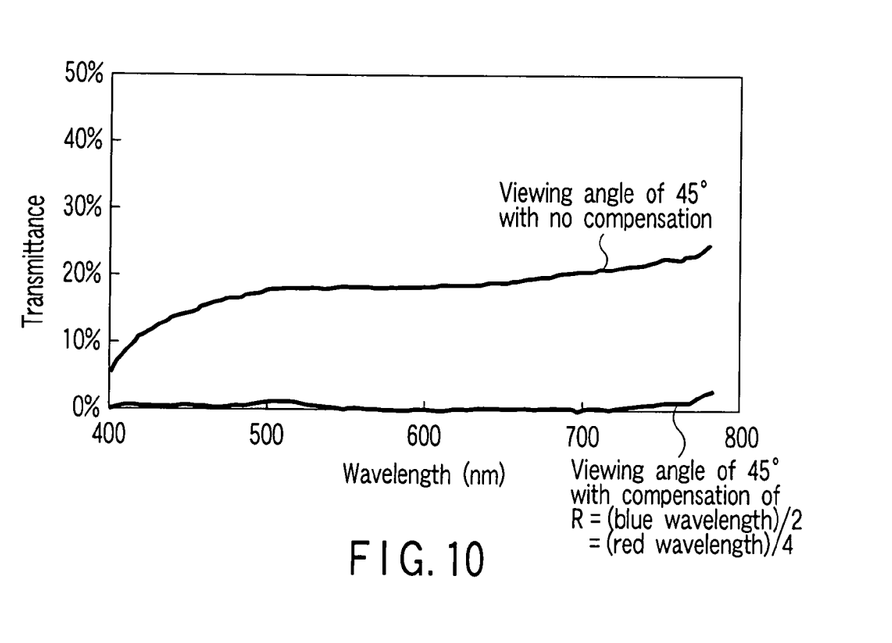
FIG. 10 is a view for explaining the wavelength dispersion with respect to the transmittance of light that passes through an optically compensated polarizing layer and phase layer.

In this example, the first phase layer 41 is formed so as to have such a wavelength dispersion as to provide a retardation of $\lambda/2$ with respect to the wavelength of blue and a retardation of $\lambda/4$ with respect to the wavelength of red. Thereby, as shown in FIG. 10, even when the screen is viewed in an oblique direction to the substrate plane, for example, when the screen is viewed at 45° to the normal of the substrate plane (viewing angle of 45°), the effect of dichroism in the first polarizing layer 51 and second polarizing layer 52 can be compensated and the transmittance can be set at about 0% in the substantially whole range of visible wavelengths. The first phase layer 41 that is formed of the above-described liquid crystal polymer has a more excellent compensation performance than a drawn phase plate (e.g. ARTON), and the manufacturing cost is lower. Furthermore, the first phase layer 41 can be formed by coating a liquid crystal polymer with several μm film thickness, the thickness of the first phase layer 41 can be made less than the thickness of the drawn phase plate, and the reduction in thickness can advantageously be achieved.

EXAMPLE

Figure 11:
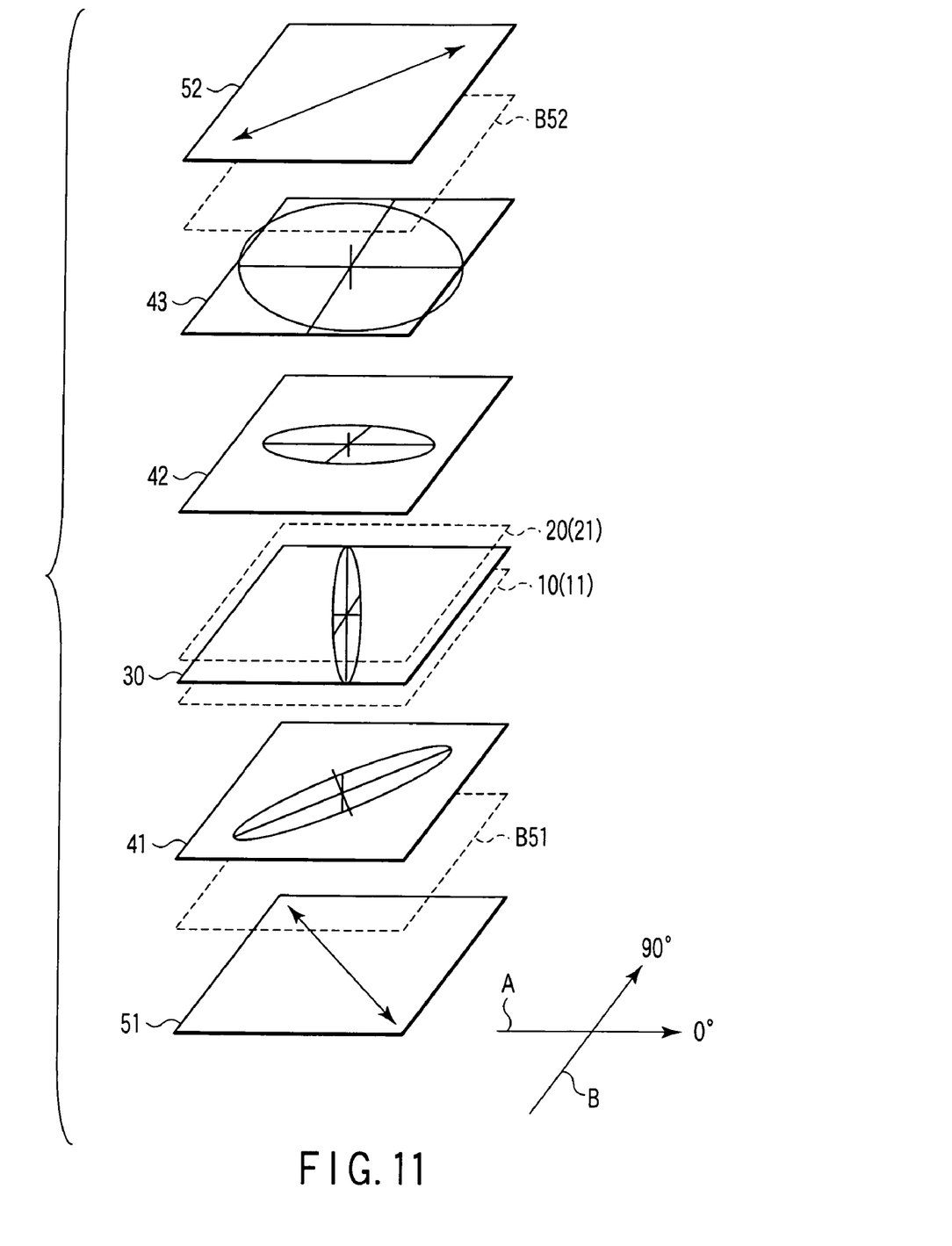
FIG. 11 is a view that schematically shows the structure of an OCB liquid crystal display device according to an Example.

As is shown in FIG. 11, an OCB liquid crystal display device is configured such that a bend liquid crystal layer 30, which is included in a liquid crystal panel, is disposed between a first polarizing layer 51 and a second polarizing layer 52. The liquid crystal molecules that are included in the bend liquid crystal layer 30 are aligned at a 90° azimuth. As has been described above with reference to FIG. 4, in the state in which an image can be displayed, the liquid crystal layer 40 has the relationship, nz>nx>ny, where nx is the major refractive index in the x-axis direction, ny is the major refractive index in the y-axis direction, and nz is the major refractive index in the z-axis direction. The x-axis corresponds to the 0° azimuth, the y-axis corresponds to the 90° azimuth, and the z-axis corresponds to the normal direction to the substrate plane. In this Example, the liquid crystal layer 30 is formed of a nematic liquid crystal layer. At a time of black display, the liquid crystal layer 30 has a retardation of 440 nm in the normal direction with respect to the wavelength of 550 nm, and a retardation of 42 nm in the in-plane direction.

The first polarizing layer 51 is disposed such that its absorption axis is set at a 135° azimuth. The second polarizing layer 52 is disposed such that its absorption axis is set at a 45° azimuth. The first polarizing layer 51 and second polarizing layer 52 are formed of, e.g. iodine-containing polyvinyl alcohol (PVA). The first polarizing layer 51 and second polarizing layer 52 are disposed between a pair of base films. The base films are formed of, e.g. TAC (triacetyl cellulose). Each of the base films has a thickness of, e.g. 40 μm and has a retardation of −40 nm in the normal direction. It should suffice if consideration is substantially given to the retardation of a base film B51 that is disposed between the first polarizing layer 51 and liquid crystal layer 30 and the retardation of a base film B52 that is disposed between the second polarizing layer 52 and liquid crystal layer 30. Thus, a retardation of −80 nm is provided in the normal direction.

The liquid crystal layer 30 has a retardation of 440 nm in the normal direction, and each of the base films B51 and B52 has a retardation of −40 nm. Thus, the remaining retardation of −360 nm may be compensated by the third phase layer 43.

In this Example, the third phase layer 43 is formed on the liquid crystal layer (30)-side major surface (surface) of the base film B52. Specifically, the surface of the base film B52 is subjected to a rubbing process in a predetermined direction, and a chiral nematic liquid crystal material with a thickness of 18 μm is coated thereon. The chiral nematic liquid crystal material is obtained by adding chiral material S811 (manufactured by Merck Ltd. in the U.K.) to a nematic liquid crystal polymer (manufactured by BASF in Germany) that has a refractive index anisotropy $\Delta n$ of, e.g. 0.116 with respect to the wavelength of sodium lines. Further, ultraviolet is radiated on the chiral nematic liquid crystal material. Thereby, the coated liquid crystal material is cured.

As has been described above with reference to FIG. 6, the thus obtained third phase layer 43 has the relationship of nx=ny>nz. The x-axis corresponds to the 0° azimuth, the y-axis corresponds to the 90° azimuth, and the z-axis corresponds to the normal direction to the substrate plane. The mean refractive index n was 1.55, the twist pitch P was about 206 nm, and the (n×P) value was about 320 nm and was less than 400 nm.

The second phase layer 42 is formed on the liquid crystal layer (30)-side major surface (surface) of the third phase layer 43. Specifically, the surface of the third phase layer 43 is subjected to a rubbing process in the 0° azimuth (the azimuth with which the absorption axis of the second polarizing layer 52 forms an angle of 45°), and a nematic liquid crystal material with a thickness of 0.4 μm is coated thereon. The nematic liquid crystal material is a nematic liquid crystal polymer (manufactured by BASF in Germany) that has a refractive index anisotropy $\Delta n$ of, e.g. 0.116 with respect to the wavelength of sodium lines. Further, ultraviolet is radiated on the nematic liquid crystal material. Thereby, the coated liquid crystal material is cured.

As has been described above with reference to FIG. 5, the thus obtained second phase layer 42 has the relationship of nx>ny=nz. The x-axis corresponds to the 0° azimuth, the y-axis corresponds to the 90° azimuth, and the z-axis corresponds to the normal direction to the substrate plane.

The stacked layer structure, in which the second polarizing layer 52 is provided on one of the major surfaces of the base film B52 and the third phase layer 43 and second phase layer 42 are provided on the other major surface of the base film B52, is disposed on the counter-substrate (20) side of the liquid crystal panel 1. Specifically, an acrylic adhesive with a thickness of about 20 μm, for instance, is coated on the surface of the second phase layer 42. The aforementioned stacked layer structure is directly attached to the insulating substrate 21 of the counter-substrate 20 via the adhesive.

On the other hand, the first phase layer 41 is formed on the liquid crystal layer (30)-side major surface (surface) of the base film B51. Specifically, the surface of the base film B51 is subjected to a rubbing process in the 45° azimuth (the azimuth with which the absorption axis of the first polarizing layer 51 forms an angle of 90°), and a nematic liquid crystal material with a predetermined thickness is coated thereon. The nematic liquid crystal material is a nematic liquid crystal polymer (manufactured by BASF in Germany) that has a refractive index anisotropy $\Delta n$ of, e.g. 0.116 with respect to the wavelength of sodium lines. In this case, the thickness of the coated nematic liquid crystal material is so set as to provide a retardation of $\lambda/2$ with respect to the wavelength of blue and a retardation of $\lambda/4$ with respect to the wavelength of red. In this Example, the thickness is set at about 1.6 μm. Further, ultraviolet is radiated on the nematic liquid crystal material. Thereby, the coated liquid crystal material is cured.

As has been described above with reference to FIG. 5, the thus obtained first phase layer 41 has the relationship of nx>ny=nz. The x-axis corresponds to the 45° azimuth, the y-axis corresponds to the 135° azimuth, and the z-axis corresponds to the normal direction to the substrate plane.

The stacked layer structure, in which the first polarizing layer 51 is provided on one of the major surfaces of the base film B51 and the first phase layer 41 is provided on the other major surface of the base film B51, is disposed on the array substrate (10) side of the liquid crystal panel 1. Specifically, an acrylic adhesive with a thickness of about 20 μm, for instance, is coated on the surface of the first phase layer 41. The aforementioned stacked layer structure is directly attached to the insulating substrate 11 of the array substrate 10 via the adhesive.

Figure 12:
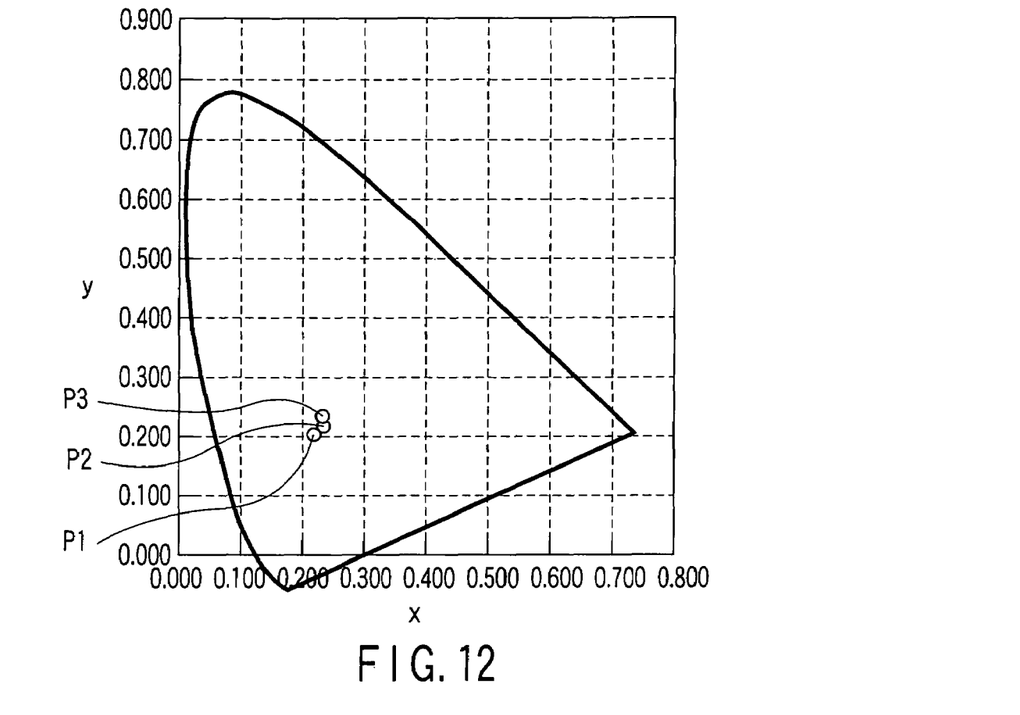
FIG. 12 is a chromaticity diagram for explaining the viewing-angle dependency at a time of black display in the OCB liquid crystal display device according to the Example.

According to the OCB liquid crystal display device of this Example, the first phase layer 41 and second phase layer 42 were optimized, and the viewing-angle dependency of chromaticity at the time of black display, as shown in FIG. 12, was successfully obtained. In FIG. 12, P1 indicates chromaticity coordinates in a case where the screen was viewed in the normal direction to the substrate plane, P2 indicates chromaticity coordinates in a case where the screen was viewed at an angle of 80° toward the right side (0° azimuth) of the screen, relative to the normal direction, and P3 indicates chromaticity coordinates in a case where the screen was viewed at an angle of 80° toward the left side (180° azimuth) of the screen, relative to the normal direction. All of P1 to P3 have substantially the same coordinate values (with little variation in hue regardless of viewing angles). It was confirmed that the viewing-angle characteristics of color reproducibility were improved.

Figure 13:
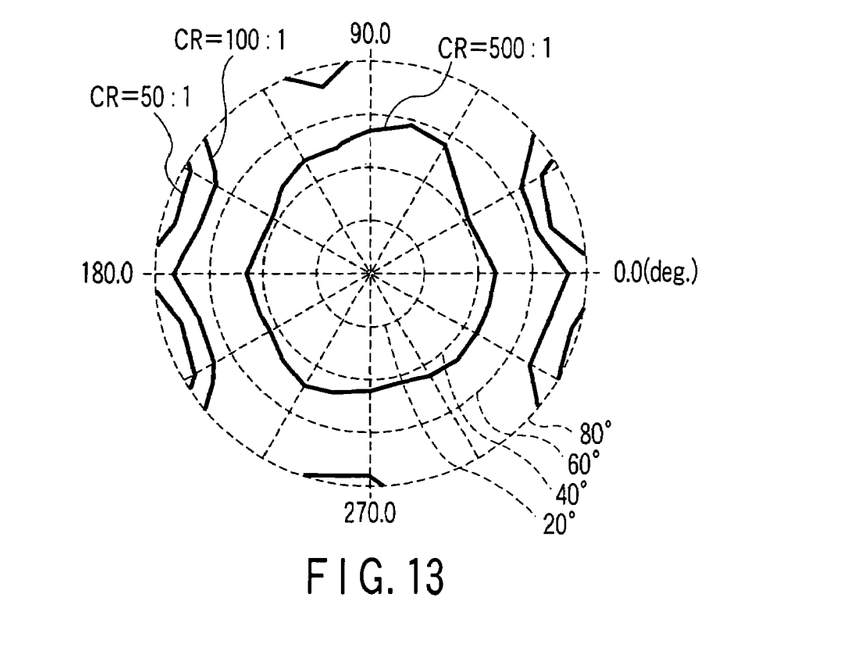
FIG. 13 is a view for explaining the viewing-angle dependency of contrast in the OCB liquid crystal display device according to the Example.

With the optimization of the third phase layer 43, the viewing-angle dependency of contrast, as shown in FIG. 13, was successfully obtained. For example, viewing angles with the contrast ratios C (R, G, B)=500:1 and 100:1 were successfully increased in the vertical and horizontal directions, and it was confirmed that the viewing-angle characteristics of contrast were improved.

Figure 14:
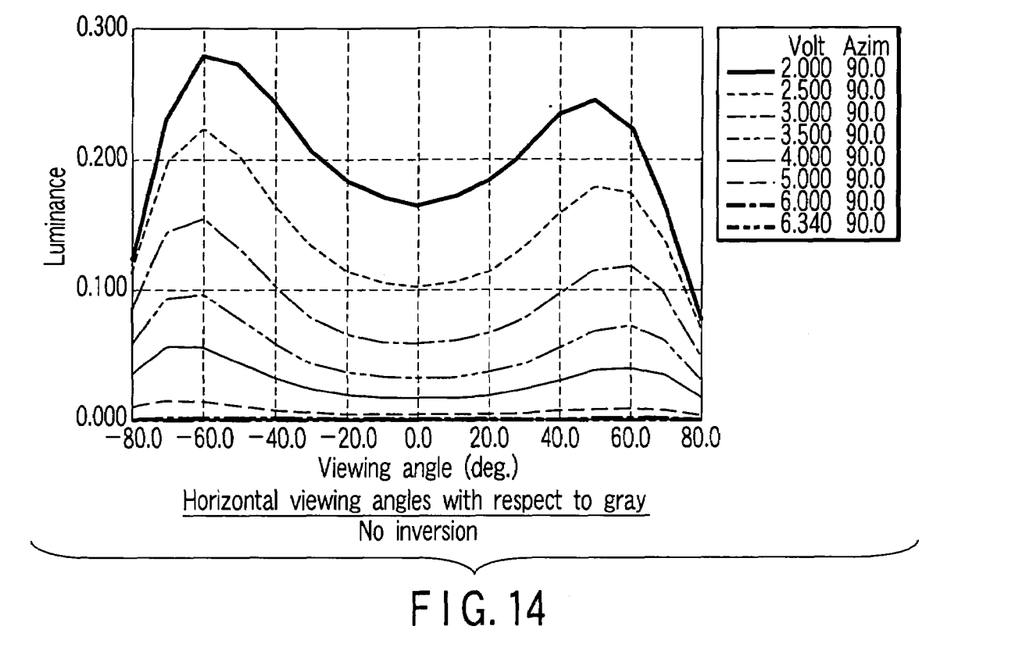
FIG. 14 shows a measurement result of luminance, relative to angles inclined to the horizontal direction of the screen, with respect to 8 gray levels in the OCB liquid crystal display device according to the Example.
Figure 15:
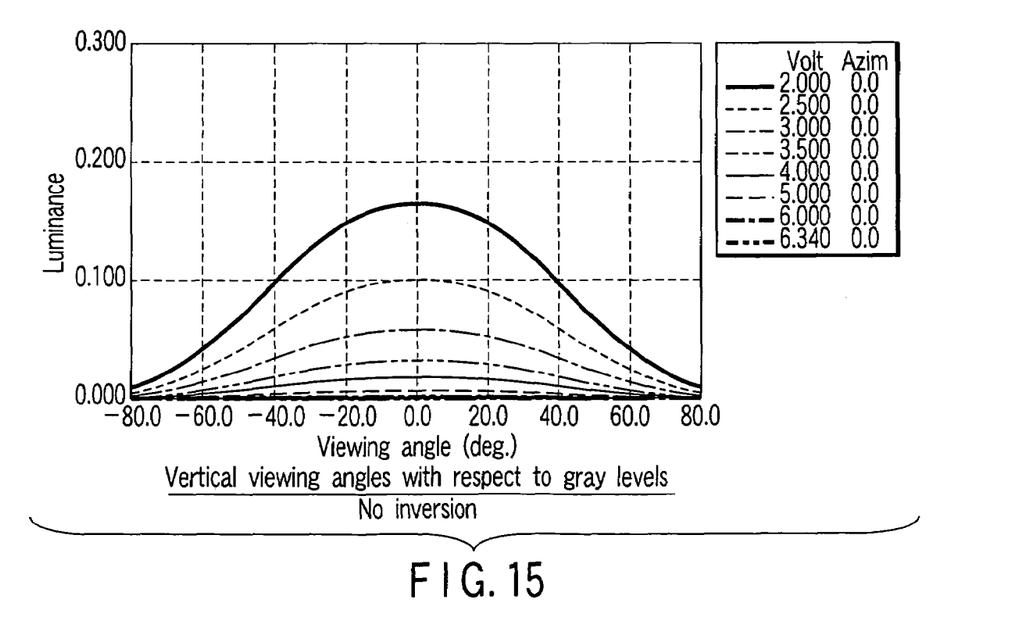
FIG. 15 shows a measurement result of luminance, relative to angles inclined to the vertical direction of the screen, with respect to 8 gray levels in the OCB liquid crystal display device according to the Example.

As regards the OCB liquid crystal display device of this Example, the luminance was measured at angles (viewing angles) with inclinations in the horizontal direction of the screen, relative to the normal, with respect to eight gray levels. The measurement result, as shown in FIG. 14, was obtained. At any angle, a so-called gray level inversion phenomenon, in which the luminance at a low gray level exceeds the luminance at a high gray level, was not confirmed. Similarly, the luminance was measured at angles (viewing angles) with inclinations in the vertical direction of the screen, relative to the normal, with respect to eight gray levels. The measurement result, as shown in FIG. 15, was obtained. At any angle, a so-called gray level inversion phenomenon, in which the luminance at a low gray level exceeds the luminance at a high gray level, was not confirmed.

The present invention is not limited to the above-described embodiments. At the stage of practicing the invention, various embodiments may be made by modifying the structural elements without departing from the spirit of the invention. Structural elements disclosed in the embodiments may properly be combined, and various inventions may be made. For example, some structural elements may be omitted from the embodiments. Moreover, structural elements in different embodiments may properly be combined.

For example, the first phase layer 41 may be formed of two or more retardation films. The first phase layer 41 is mainly designed to compensate the positive dichroism in the first polarizing layer 51 and second polarizing layer. It should suffice if the first phase layer 41 is provided at least at one of a position close to the first polarizing layer 51 between the first polarizing layer 51 and liquid crystal layer 30, and a position close to the second polarizing layer 52 between the second polarizing layer 52 and liquid crystal layer 30.

The second phase layer 42 may be formed of two or more retardation films. The second phase layer 42 is mainly designed to compensate the retardation in the in-plane direction of the liquid crystal layer 30. It should suffice if the second phase layer 42 is provided between the first phase layer 41, and the first polarizing layer 51 or second polarizing layer 52.

Similarly, the third phase layer 43 may be formed of two or more retardation films. The third phase layer 43 is mainly designed to compensate the retardation in the normal direction in the liquid crystal layer 30. It should suffice if the third phase layer 43 is provided between the first phase layer 41, and the first polarizing layer 51 or second polarizing layer 52.

The present invention can provide a liquid crystal display device with excellent viewing-angle characteristics and display quality, which is capable of realizing cost reduction.

What is claimed is:

1. A liquid crystal display device including:
a liquid crystal panel having a liquid crystal layer held between a pair of substrates;
a first polarizing layer that is disposed on a light incidence side of the liquid crystal panel; and
a second polarizing layer that is disposed on a light emission side of the liquid crystal panel,
the liquid crystal display device being of a birefringence mode, in which the liquid crystal layer has a residual retardation in an in-plane direction and has a positive retardation in a thickness direction at a time of dark display of the liquid crystal display device,
wherein a first phase layer formed of a liquid crystal polymer and that is a positive uniaxial phase layer, which compensates viewing-angle characteristics with respect to light emerging from the first polarizing layer, is disposed between the first polarizing layer and the liquid crystal layer
a second phase layer, which compensates the residual retardation in the liquid crystal layer, and a third phase layer, which compensates the positive retardation in the thickness direction of the liquid crystal layer, are provided between the second polarizing layer and the first phase layer, and
multiplication values $(\Delta n1_{(440)} \times t1)$ and $(\Delta n1_{(620)} \times t1)$, which are obtained by multiplying a layer thickness t1 of the liquid crystal polymer that forms the first phase layer by refractive index anisotropies $\Delta n1_{(440)}$ and $\Delta n1_{(620)}$ at wavelengths of 440 nm and 620 nm of liquid crystal molecules in the liquid crystal polymer layer, are nearly $m\lambda/8$ (m=1, 2, 3, 4, ...) with respect to a wavelength $\lambda$.

* * * * *